(12) United States Patent
Guo et al.

(10) Patent No.: US 10,813,361 B2
(45) Date of Patent: Oct. 27, 2020

(54) USE OF AGRIMONIA PILOSA EXTRACT IN PREPARATION OF DRUG FOR REMOVING PLANT VIRUS IN TOMATO PLANTS

(71) Applicant: JIANGSU ACADEMY OF AGRICULTURAL SCIENCES, Jiangsu (CN)

(72) Inventors: Huifang Guo, Jiangsu (CN); Kaili Zhang, Jiangsu (CN); Zhichun Zhang, Jiangsu (CN); Dongxiao Zhao, Jiangsu (CN)

(73) Assignee: JIANGSU ACADEMY OF AGRICULTURAL SCIENCES (CN)

( * ) Notice: Subject to any disclaimer, the term of this patent is extended or adjusted under 35 U.S.C. 154(b) by 0 days.

(21) Appl. No.: 16/468,123

(22) PCT Filed: Mar. 28, 2018

(86) PCT No.: PCT/CN2018/080974
§ 371 (c)(1),
(2) Date: Jun. 10, 2019

(87) PCT Pub. No.: WO2018/214641
PCT Pub. Date: Nov. 29, 2018

(65) Prior Publication Data
US 2020/0107553 A1 Apr. 9, 2020

(30) Foreign Application Priority Data
May 24, 2017 (CN) .......................... 2017 1 0381698

(51) Int. Cl.
*A61K 36/00* (2006.01)
*A01N 65/34* (2009.01)

(52) U.S. Cl.
CPC .................................. *A01N 65/34* (2013.01)

(58) Field of Classification Search
None
See application file for complete search history.

(56) References Cited

FOREIGN PATENT DOCUMENTS

| CN | 101396446 |   | 4/2009  | ............ A61K 36/73 |
|----|-----------|---|---------|-------------------------|
| CN | 101396447 |   | 4/2009  | ............ A61K 36/73 |
| CN | 102630710 |   | 8/2012  | ............ A01N 63/04 |
| CN | 103493669 B | * | 12/2014 |                       |
| CN | 104430331 |   | 3/2015  | ............ A01N 25/30 |
| CN | 104920497 A | * | 9/2015  |                       |
| CN | 104996231 |   | 10/2015 | ............ A01G 1/00  |
| CN | 107212029 |   | 9/2017  | ............ A01N 65/34 |
| KR | 20030030922 A | * | 4/2003  | ............ A61K 36/73 |
| KR | 20160029969 |   | 3/2016  | ............ A01N 65/08 |

OTHER PUBLICATIONS

International Search Report (w/translation) and Written Opinion (w/machine translation) issued in application No. PCT/CN2018/080974, dated Jun. 20, 2018 (11 pgs).

Qu, Yufeng, "Characteristics of symbiont and tomato yellow leaf curl virus infection in Bemisia tabaci, and effects of extract from *Agrimonia pilosa* on natural enemies" (w/machine translation) Nanjing Agricultural University Master's Dissertation, Jun. 30, 2012, pp. 53-58 (11 pgs).

\* cited by examiner

*Primary Examiner* — Qiuwen Mi
(74) *Attorney, Agent, or Firm* — Hayes Soloway P.C.

(57) ABSTRACT

Disclosed are the use of an *Agrimonia pilosa* extract in the preparation of an agent for inhibiting or reducing growth virus in tomato plants, and a method for the *Agrimonia pilosa* extract.

4 Claims, No Drawings
Specification includes a Sequence Listing.

USE OF AGRIMONIA PILOSA EXTRACT IN PREPARATION OF DRUG FOR REMOVING PLANT VIRUS IN TOMATO PLANTS

I. TECHNICAL FIELD

The present invention relates to the technical field of pest control, particularly to the use of extracts of *Agrimonia pilosa* in preparing an agent for removing plant viruses in tomato plants.

II. BACKGROUND ART

Plant viruses cause crop yield losses of 10-15% around the world every year. The prevention and control of plant viruses mainly rely on the virus-resistant varieties, virus antagonists, etc. The plant viruses transmitted by insect vectors can also be controlled by vector management through pesticide applications or physical methods. However, the present measures are still insufficient. For example, the virus antagonists control viruses mainly through suppressing the virus infection, inhibiting virus proliferation and transport, inhibiting the expression of viral symptoms, inducing plant resistance, etc. There are still rare reports on how to remove the existing virus in plants. Currently, products for management of plant virus available in the markets include Ningnanmycin, amino-oligosaccharin, lentinan, etc., all of which mainly induce resistance to virus. However, it is difficult to achieve ideal efficacy on viruses transmitted by insect vectors, as some vectors have developed resistance to chemical pesticides. For example, the vector, *Bemisia tabaci* has developed resistance to organophosphorus insecticides. And therefore, the management on plant virus diseases still focus on the prevention of virus, there is no effective curative treatment for plant virus. For effectively controlling plant viruses, it is of extreme importance to explore methods to remove viruses from the plants.

Tomato Yellow Leaf Curl virus (TYLCV) belongs to the genus Begomovirus and the family Geminiviridae, which is a single-stranded circular DNA virus transmitted by *B. tabaci*. The invasion of *B. tabaci* has caused the prevalence of TYLCV in many countries in Asia, Africa, America, etc. In China, TYLCV has spread to a number of provinces such as Jiangsu, Zhejiang, Yunnan, etc., resulting in dramatic reduction in the yields and quality of tomatoes.

Screening active substances against plant viruses from nature is an important way to obtain antiviral agents. Plant-derived extracts are abundant in source, and some plant-derived extracts have been found to have an antagonism on plant viruses, for example, eugenol can antagonize TYLCV, but it is still unclear whether plant-derived extracts can remove viruses from plants. *Agrimonia pilosa* is a perennial herb belonging to family Rosaceae, which is distributed in many regions in China. *A. pilosa* has a variety of functions such as anti-tumor, anti-inflammatory and analgesic, lowering blood sugar, lowering blood pressure and enhancing body immunity, etc., so it is a traditional Chinese medicine with wide usages.

In agriculture, it has been found that *A. pilosa* extracts can improve the parasitic ability and resistance of insect parasitoids to chemical insecticide, and improve the prey ability of spiders to insect pests (Chinese Patent No. ZL 200810156163.3, ZL 200810156162.9). Here, the effect of *A. pilosa* extracts on TYLCV in tomato plants is studied, which we expect to develop extracts of *A. pilosa* as agents to remove the plant viruses in tomato plants, and thus cure virus diseases.

III. CONTENTS OF THE INVENTION

1. The Object of the Present Invention

The object of the present invention is to provide a method for preparing agent to remove plant viruses in tomato plants using extracts of *A. pilosa*. It can completely remove TYLCV in some tomato plants, reduce the quantity of plant viruses in some tomato plants, which point to a new approach for the treatment of TYLCV.

2. Technical Solutions

The present invention relates to a method for removing plant viruses in tomato plants, and particularly to a method to remove TYLCV in tomato plants using extracts of *A. pilosa*. A method with *A. pilosa* extracts in preparing agents for removing plant viruses in tomato plants is provided, wherein the extracts of *A. pilosa* is made according to the following steps: pulverize the traditional Chinese medicine *A. pilosa* using a universal pulverizer, weigh 200 g dry powder and place into a 1,000 mL erlenmeyer flask, add 500 mL of 75% ethanol, and extract for 14 days under room temperature, then filter and concentrate the mixture under reduced pressure in a water bath using a rotary evaporator, evaporate the alcohol to obtain the Chinese herbal extract and dry it, then dissolve the obtained product in 25 mL of acetone. The original concentration of extracts of *A. pilosa* is expressed by the following equation: concentration=dry weight of the medicinal herb/final volume of the extract. By calculation, the original concentration of *A. pilosa* is 8 g/mL. Keep the extracted solution in a 4° C. refrigerator for standby.

3. Benefits

Compared with the previous method, the method of the present invention can produce the following beneficial effects: (1) compared to the conventional virus antagonist that controls TYLCV through suppressing virus proliferation, the present invention can control the virus diseases by effectively removing the plant viruses in tomato plants, and achieve virus therapy; (2) compared to the chemical agents controlling viruses, the present invention can effectively improve the pollution-free control level of virus disease control and effectively reduce the environmental pollution by using the *A. pilosa* extracts.

IV. EMBODIMENTS

In the embodiments of the present invention, the laboratory experiments were carried out.

Experimental materials:

1. Tomato seedling: The commercially available tomato seedlings (Yingshi Dahong) were planted in greenhouse, and used for experiments when growing up to 3-true-leaf stage.

2. *Bemisia tabaci* carrying TYLCV: The viruliferous whiteflies were collected from field tomatoes (tomato cultivar-Hezuo 908) in Nanjing, Jiangsu, China in August 2011, and fed on tomato seedlings infected with TYLCV in the laboratory for a long time (tomato cultivar-Hezuo 908) to insure the virus infection in whiteflies.

The determination method:

1. Inoculation of virus on tomato plants

Healthy tomato seedlings were inoculated with virus. Every 10 pots (i.e. 10 seedlings) were used as a replicate (placed in the same cage), and inoculated with 30 newly emerged viruliferous whiteflies. 7 days later, the whiteflies were taken out, and the tomato plants were used for subsequent treatment.

2. Extraction of *Agrimonia pilosa* with ethanol

The traditional Chinese medicine *A. pilosa* was pulverized using a universal pulverizer, 200 g dry powder were weighed and placed to a 1,000 mL erlenmeyer flask, 500 mL of 75% (mass fraction) ethanol was added and was extracted for 14 days under room temperature, then the mixture was filtered and concentrated under reduced pressure in a water bath of 40° C. using a rotary evaporator, the alcohol was evaporated to obtain the Chinese herbal extract and was dried naturally at room temperature (25-30° C.), and then the obtained product was dissolved in 25 mL acetone. The original concentration of *A. pilosa* extract was expressed by the following equation: concentration=dry weight of the medicinal herb/final volume of the extracts. By calculation, the original concentration of *A. pilosa* was 8 g/mL. The extracted solution was kept in a 4° C. refrigerator for standby.

3. Treatment of tomato seedlings with extracts of *Agrimonia pilosa*

Tomato seedlings fed with viruliferous whiteflies were treated by a root-drenching method. There were three kinds of treatments: tomato seedlings with viruliferous whiteflies treated with 0.1 g/mL extracts of *A. pilosa*, tomato seedlings with viruliferous whiteflies treated with water as positive control, tomato seedlings without viruliferous whiteflies treated with water as negative control. Each seedling was treated with 20 mL of extract solution or water. After root-drenching, the seedlings were placed in a cage, every 10 seedlings (pots) of the same treatment were placed in one cage. Each treatment was repeated 4 times, with a total of 40 seedlings, and each seedling was numbered. Tomato seedlings were used to observe the growth and morbidity, the presence and quantity of TYLCV in each plant was tested by analysing virus in the new leaf of the plant. The experiments were performed in a room with a plant growth lamp at a temperature of 27° C. and a daily light exposure time of 14 hours.

4. DNA extraction of tomato plants

Samples were taken at different times before and after treatment. One upper leaf of each plant was taken and placed into a refrigerator at 20° C. for the detection of TYLCV. For qualitative analysis, samples of virus were extracted from the leaves of a single plant, and one month and two months after treatment, samples were taken respectively. For quantitative detection, 10 plants (one replicate) were used as a group for DNA extraction, and samples were taken in 6 weeks and 10 weeks after treatment. DNA extraction: Samples, 20 µL of DNA alkaline lysate (50 mmol/L Tris-HCl (pH 8.0), 20 mmol/L NaCl, 1 mmol/L EDTA, 1% SDS) were added to a 1.5 ml centrifuge tube and ground thoroughly. 1 µL of proteinase K (20 mg/ml) was added and centrifuged for 30 seconds, and was incubated at 60° C. for 1 hour, and then 1 µL of proteinase K was added and centrifuged for 30 seconds, and continued to be incubated for 2 hours, and then 178 µL of double distilled water was added, followed by incubation at 100° C. for 5 minutes to inactivate proteinase K. 100 µL of extracted solution was taken to another centrifuge tube, and 2-fold volume of pre-cooled ethanol was added and mixed thoroughly, and then precipitated in a refrigerator at 4° C. overnight, centrifuged at 13,000 rpm for 10 minutes at 4 ° C., then the ethanol was poured out, and dried, and then 20 µL double distilled water was added to dissolve DNA, stored at −20° C. for following investigation.

5. Qualitative detection of TYLCV in tomato plants

The specific primers for qualitative detection of TYLCV:

```
SEQ ID NO. 1: TV_P833
(5'-GGTCTACACGCTTACGCCTTATT-3');

SEQ ID NO. 2: PATY_R
(5'-TTCCATCCGAACATTCAGGCAGC-3');
```

The amplified fragment was approximately 800 bp.

The PCR reaction system was 10 µL, containing 5 µL of Mix (100 mM KCl, 20 mM Tris-HCl, 3 mM $MgCl_2$, 400 µM dNTPs, bromophenol blue), 0.2 µL of taq enzyme (5 U/µL), 0.5 µL of primer TV_P833, 0.5 µL of primer PATY_R, 3.2 µL $H_2O$, 0.6 µL DNA template.

The PCR parameters: pre-denaturation at 95° C. for 5 minutes, denaturation at 94° C. for 45 seconds, annealing at 56° C. for 45 seconds, extension at 72° C. for 1 minute, 35 cycles, and extension at 72° C. for 20 minutes after the end of the cycle.

The PCR product was subjected to electrophoresis and sequence clone, to identify the species of virus. The number of tomato plants carrying the virus was recorded and the virus carrying rate was calculated.

6. Quantitative detection of TYLCV in tomato plants

The number of copies of TYLCV genome fragments 1462(+) to 1601(−) was determined by ABI StepOne fluorescence quantitative PCR instrument. The primers for amplification of TYLCV genome fragments 1462(+) to 1601(−):

```
SEQ ID NO. 3: (YG3)
5'-GAGTTCCCCTGTGCGTGAA-3';

SEQ ID NO. 4: (YG5)
5'-CTGTTCGCAAGTATCAATCAAGGT-3';
```

The reaction system: 10 µL of 2×SYBR® Premix Ex Taq (Tli RNaseH Plus) (Takara), 0.6 µL of each primer, 0.4 µL of Reference Dye II, 1 µL of DNA and 7.4 µL of $ddH_2O$.

Amplification procedure: 52° C. for 2 minutes, 95° C. for 1 minutes, 40 cycles: 95° C. for 5 seconds, 60° C. for 30 seconds, 72° C.

7. Data analyses

To compare the difference among treatments, the infection rate and quantity of TYLCV in tomato plants were analyzed by t-test using statistical software SPSS17.0.

8. Results

1) Effect of extracts of *Agrimonia pilosa* on the infection rate of TYLCV in tomato plants The study on the infection rate of TYLCV in tomato plants treated by extracts of *A. pilosa* showed that, before treatment, the infection rates of TYLCV in tomato plants of the two tested groups were 95% and 90% respectively, and there was no significant difference between them (t=1, P=0.3559); one month after treatment, the infection rates of TYLCV in tomato plants treated with extracts of *A. pilosa* and water were 60% and 87.5% respectively, and there was also no significant difference between the two treatments (t=2.2, P=0.0701); two months after treatment, the virus infection rate of the extracts treatment was 42.5%, which was significantly lower than that of the control (as high as 97.5%) (t=6.96, P=0.0004), indicating that the extracts of *A. pilosa* effectively removed TYLCV in some tomato plants.

2) Effect of *Agrimonia pilosa* extracts on the quantity of TYLCV in tomato plants The study on the quantity of TYLCV in tomato plants treated with extracts of *A. pilosa* showed that, six weeks after treatment, the quantity of TYLCV in tomato plants in the *A. pilosa* extract treatment was significantly lower than that of the control group (t=3.95, P=0.0168); ten weeks after treatment, the quantity of virus was still significantly lower than that of the control (t=3.3, P=0.0298), indicating that the extracts of *A. pilosa* effectively reduced the quantity of TYLCV in tomato plants.

The invention claimed is:

1. A method for inhibiting or reducing growth of Tomato Yellow Leaf Curl virus (TYLCV) in a tomato plant, the method consisting essentially of applying to the roots of growing tomato plant an effective amount of an alcohol extract of *Agrimonia pilosa*, diluted in water.

2. The method according to claim 1, wherein extract is applied as an aqueous solution to the roots of the tomato plant.

3. The method according to claim 2, wherein the extract is applied multiple times.

4. The method according to claim 1, wherein the extract is applied to the roots tomato seedlings.

* * * * *

```
                        SEQUENCE LISTING

<160> NUMBER OF SEQ ID NOS: 4

<210> SEQ ID NO 1
<211> LENGTH: 23
<212> TYPE: DNA
<213> ORGANISM: Unknown
<220> FEATURE:
<223> OTHER INFORMATION: TV_P833

<400> SEQUENCE: 1
ggtctacacg cttacgcctt att                                         23

<210> SEQ ID NO 2
<211> LENGTH: 23
<212> TYPE: DNA
<213> ORGANISM: Unknown
<220> FEATURE:
<223> OTHER INFORMATION: PATY_R

<400> SEQUENCE: 2
ttccatccga acattcaggc agc                                         23

<210> SEQ ID NO 3
<211> LENGTH: 19
<212> TYPE: DNA
<213> ORGANISM: Unknown
<220> FEATURE:
<223> OTHER INFORMATION: YG3

<400> SEQUENCE: 3
gagttcccct gtgcgtgaa                                              19

<210> SEQ ID NO 4
<211> LENGTH: 24
<212> TYPE: DNA
<213> ORGANISM: Unknown
<220> FEATURE:
<223> OTHER INFORMATION: YG5

<400> SEQUENCE: 4
ctgttcgcaa gtatcaatca aggt                                        24
```